(12) United States Patent
Bourdrez et al.

(10) Patent No.: US 11,299,198 B2
(45) Date of Patent: Apr. 12, 2022

(54) METHOD FOR DETERMINING THE TRACK ROD FORCE MODELING THE TORSIONAL ELASTIC RELEASE OF THE TYRE IN ORDER TO MANAGE TRANSITIONS BETWEEN PARK AND DRIVE

(71) Applicant: JTEKT EUROPE, Irigny (FR)

(72) Inventors: Sébastien Bourdrez, Yzeron (FR); Pierre Dupraz, Irigny (FR); Serge Gaudin, Saint Jean de Touslas (FR); Pascal Moulaire, La Tour de Salvagny (FR); Kazusa Yamamoto, Lyons (FR)

(73) Assignee: JTEKT EUROPE, Irigny (FR)

( * ) Notice: Subject to any disclaimer, the term of this patent is extended or adjusted under 35 U.S.C. 154(b) by 205 days.

(21) Appl. No.: 16/611,736

(22) PCT Filed: May 15, 2018

(86) PCT No.: PCT/FR2018/051173
§ 371 (c)(1),
(2) Date: Nov. 7, 2019

(87) PCT Pub. No.: WO2018/215711
PCT Pub. Date: Nov. 29, 2018

(65) Prior Publication Data
US 2020/0102006 A1 Apr. 2, 2020

(30) Foreign Application Priority Data
May 23, 2017 (FR) ..................... 17/54566

(51) Int. Cl.
*B62D 6/00* (2006.01)
*B62D 5/04* (2006.01)

(52) U.S. Cl.
CPC ........... *B62D 6/008* (2013.01); *B62D 5/0463* (2013.01); *B62D 5/0472* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2014/0008141 A1* | 1/2014 | Kageyama | ............... | B62D 7/18 180/400 |
| 2015/0291210 A1* | 10/2015 | Kageyama | ............... | B62D 5/04 701/41 |

FOREIGN PATENT DOCUMENTS

| | | | |
|---|---|---|---|
| JP | 2008-189119 A | 8/2008 | |
| WO | 2016/005671 A1 | 1/2016 | |
| WO | WO-2016005671 A * | 1/2016 | ............. B62D 6/008 |

OTHER PUBLICATIONS

A. Zaremba et al: "Dynamic Analysis of Stability of a Power Assist Steering System", Proceedings of the 1995 American control Conference : The Westin Hotel, Seattle, Washington, Jun. 21-25, 1995, vol. 6 Jan. 1995, pp. 4253-4257 (Year: 1995).*
(Continued)

*Primary Examiner* — Aniss Chad
*Assistant Examiner* — Christopher George Fees
(74) *Attorney, Agent, or Firm* — Oliff PLC (57) ABSTRACT

A method estimates a track rod force which is exerted, in a power steering system with which a vehicle is equipped, on a track rod belonging to a steering mechanism which connects an actuator to a steered wheel which is orientable in the yaw direction and which bears a tyre of which the tread is in contact with the ground, the value of the estimated track rod force being corrected as a function of the longitudinal speed of the vehicle by a force component that models the release of the elastic torsion of the tyre so as to reduce, the estimated track rod force according to the longitudinal speed of the vehicle, when the vehicle transitions from a park
(Continued)

situation in which the longitudinal speed of the vehicle is zero to a drive situation in which the longitudinal speed of the vehicle is non-zero.

13 Claims, 3 Drawing Sheets

(52) U.S. Cl.
 CPC ...... *B60T 2260/02* (2013.01); *B60W 2510/20* (2013.01); *B60W 2520/14* (2013.01)

(56) References Cited

OTHER PUBLICATIONS

Zaremba et al.; "Dynamic Analysis and Stability of a Power Assist Steering System;" Proceedings of the 1995 American Control Conference; 1995; pp. 4253-4257; vol. 6.
Aug. 1, 2018 Search Report issued in International Patent Application No. PCT/FR2018/051173.

* cited by examiner

METHOD FOR DETERMINING THE TRACK ROD FORCE MODELING THE TORSIONAL ELASTIC RELEASE OF THE TYRE IN ORDER TO MANAGE TRANSITIONS BETWEEN PARK AND DRIVE

The present invention concerns power steering systems, and more particularly the methods allowing evaluating a force called «force at the tie rods» which is representative of the forces transmitted by the running gear to the steering rack, via the steering tie rods.

It is in practice this «force at the tie rods» that the driver and the steering power assistance must overcome in order to be able to change the yaw orientation of the steered wheels.

There are methods that allow estimating the force at the tie rods by means of magnitudes characteristic of the lateral dynamics of the vehicle, for example from the lateral acceleration or the yaw rate of the vehicle.

Such methods, nonetheless, rely on models that are valid only in a running situation, and starting from a significant longitudinal velocity of the vehicle, typically from 50 km/h.

It is otherwise possible to estimate the force at the tie rods in a parking situation, when the vehicle is stationary Nonetheless, the models used to estimate the force at the tie rods at stop are no longer applicable as soon as the vehicle starts moving.

However, with the increasing sophistication of power steering systems, and in particular with the announced expansion of steering systems called «steer-by-wire» that no longer include a mechanical transmission between the steering wheel and the steering mechanism that actuates the wheels, it becomes necessary to reliably evaluate the force at the tie rods under all circumstances, and in particular, in a low velocity range, typically between 0 km/h and 30 km/h, in order to return to the driver, through the steering wheel, a reliable feeling of the road and the behavior of the vehicle.

Consequently, the objects assigned to the invention aim at overcoming the shortcomings of the known methods and at proposing a new method for evaluating the force at the tie rods which allows evaluating reliably the force at the tie rods at low velocities, and more particularly during the transitions between a parking situation and a running situation (or vice versa).

The objects assigned to the invention are achieved by means of a force estimation method intended to estimate the value of an actuation force, called «force at the tie rods», which is exerted in a power steering system equipping a vehicle, on a transmission member, such as a steering tie rod, belonging to a steering mechanism which connects an actuator, such as a steering wheel or a power-assist motor, to a steered wheel which is orientable in yaw and which carries a tire whose tread is in contact with a ground, said method being characterized in that the estimated value of the force at the tie rods is corrected according to the longitudinal velocity of the vehicle, so as to reduce, in absolute value, the estimated force at the tie rods, according to the longitudinal velocity of the vehicle, when the vehicle moves from a parking situation, in which the longitudinal velocity of the vehicle is zero, to a running situation, in which the longitudinal velocity of the vehicle is non-zero.

Advantageously, the use of the longitudinal velocity of the vehicle as a parameter for attenuating the estimated value of the force at the tie rods according to the invention allows modeling, and therefore taking into consideration, the yaw torsion force exerted by the tire on the wheel and the tie rod, because of the frictions of the tread of the tire on the ground that oppose the orientation movement of the wheel, and especially modeling and taking into consideration the gradual relaxation of said torsion force, which occurs during a transition from a parking situation, at zero velocity, to a running situation, at a non-zero velocity.

Indeed, the inventors have found that, when stopped, a displacement of the rack, and therefore a displacement of the tie rod and the rigid rim of the wheel, connected to said rack, causes an elastic torsional deformation of the tire, in yaw, due to the existence of a static friction between the ground and the tire tread, which tends to retain said tread against the yaw displacement of the rim.

Due to the elastic deformation of the sidewalls of the tire, which connect the rim to the tread, it thus appears an angular offset in yaw, that is to say a deviation in position between the rim on the one hand and the tread of the tire which is in contact with the ground on the other hand.

More particularly, when at stop, when turning the steering wheel to increase the steering angle of the steering system, the steering angle (yaw angle) of the tread is smaller than the steering angle (yaw angle) of the rim, as it is determined by the position of the rack.

However, as soon as the vehicle begins to run, the rotation of the wheel has the effect of causing a progressive elastic return of the tire, that is to say an elastic relaxation of the yaw torsion, such that the tread of the tire tends to align with the rim, and thus «to catch» substantially the yaw angle of said rim.

Advantageously, the invention allows taking into consideration this transient relaxation phenomenon, by a modeling that involves the position of the rack (which is considered representative of the yaw position of the rim, given the relatively rigid nature of the connections which connect them to one another) as well as the longitudinal velocity of the vehicle, and which thus allows simulating in a very complete manner the changes in the elastic torsional stress exerted by the tire on the steering mechanism, and more particularly on the tie rod and the rack.

Consequently, the method according to the invention allows achieving a particularly accurate and reliable estimate of the force at the tie rods, in particular during a transition between a parking situation and a running situation (or vice versa), as well as when the vehicle is traveling at low velocity, typically between 0 km/h and 20 km/h, or even 30 km/h.

Other objects, features and advantages of the invention will appear in more detail on reading the description which follows, as well as using the appended drawings, provided for purely illustrative and non-limiting purposes, among which.

Figure 1:
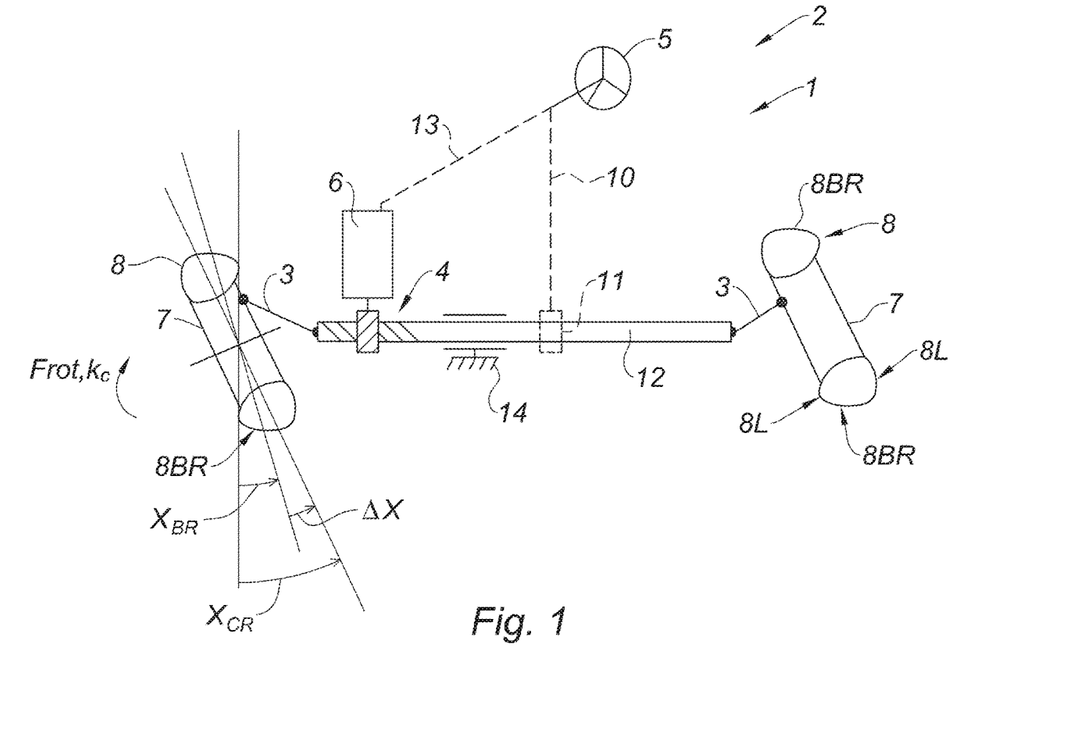
FIG. 1 illustrates, according to a schematic view, an example of a power steering system to which the method according to the invention can be applied.

The present invention concerns a force estimation method intended to estimate the value of an actuation force Fb, called «force at the tie rods», which is exerted in a power steering system 1 equipping a vehicle 2, on a transmission member 3, such as a steering tie rod 3.

Said transmission member 3 belongs to a steering mechanism 4 which connects an actuator 5, 6, such as a driving wheel 5 or a power-assist motor 6, preferably an electric power-assist motor 6, to a steered wheel 7 which is orientable in yaw.

Said wheel 7 carries a tire 8 whose tread 8BR is in contact with a ground 9.

The ground 9 may be of any kind, and corresponds to any surface or coating on which the vehicle 2 can travel, including, but not limited to, bitumen (road), gravel, earth, sand. Said ground 9 may be dry or wet.

For convenience of description, the notion of wheel 7 will be herein assimilated to the rigid portion of the wheel 7, typically formed by a rim, preferably metallic.

According to a first variant, the steering mechanism 4 will comprise a mechanical connection 10, such as a steering column 10, enabling the transmission of movement (and forces) between the steering wheel 5 and the steered wheels 7, for example via a pinion 11 mounted on said steering column 10 and meshing on a rack 12.

According to a second variant of the invention, particularly preferred, the connection between the steering wheel 5 and the wheels 7 will be virtually performed by means of an electric control 13, so that the power steering system will form a system called «steer-by-wire» system.

Possibly, the mechanical connection 10 between the steering wheel 5 and the wheels 7 may be disengageable, to be able to switch alternately from the first variant (with the mechanical connection between the steering wheel and the wheels) to the second variant (steer-by-wire).

Preferably, regardless of the considered variant, and as illustrated in FIG. 1, the steering mechanism comprises a rack 12 movably mounted relative to the frame 14 of the vehicle 2, and more particularly guided in translation according to its longitudinal axis relative to the frame 14 of the vehicle.

As indicated above, the transmission member 3 is preferably formed by a steering tie rod 3.

Preferably, said steering tie rod 3 herein connects one end of the rack 12 to the steered wheel 7, and more particularly to a stub axle orientable in yaw and which carries said steered wheel 7.

In practice, the force at the tie rods Fb will therefore correspond to a longitudinal tension or compression force of the rack 12, which is exerted by the running gear, herein the wheels 7, and via the tie rods 3, on the ends of the rack 12.

Thus, the method is in practice preferably intended to determine an actuation force called «force at the tie rods» Fb representative of the force exerted by a transmission member formed by a steering tie rod 3 on one end of a rack 12 which is movably mounted relative to the frame 14 of the vehicle, and that said tie rod 3 connects to the steered wheel 7.

For convenience of description, the transmission member may be assimilated to a steering tie rod 3 in what follows.

Moreover, regardless of its shape, the transmission member 3 is of course rigid, and in particular more rigid than the sidewalls 8L of the tire 8.

The sidewalls 8L of the tire herein refer to the lateral portions of the tire 8 which connect the wheel 7, and more particularly the rim, to the tread 8BR.

More generally, the steering mechanism 4, and more particularly the kinematic chain which extends from the rack 12 to the wheel 7, and more particularly which extends from the rack 12 to the rigid rim of said wheel 7, through the tie rod 3, is rigid, and has a rigid behavior, barely sensitive to the elastic deformation, compared to the sidewalls of the tire 8L.

Thus, it may be considered, at least in a first approach, that the position of the rim, and therefore the position of the wheel 7, may be assimilated to the position of the tie rod 3 and therefore the position of the rack 12, whereas most, and even all, of the positional offset between the tread 8BR of the tire and the rack 12 will be due to the elastic torsion of the tire 8 relative to the wheel 7 (the rim).

Nonetheless, according to another approach, alternatively, for the purposes of the invention a more complete modeling that would take into consideration the elasticity of the kinematic chain extending from the rack 12 to the wheel 7 could be used.

Such a modeling could for example take into consideration the possible positional offsets between the wheel 7 and the rack 12 which would be due to the intrinsic elasticity of the mechanical members corresponding to mechanical portions generally considered to be rigid (such as the tie rods 3, or the stub-axles), or the positional offsets that would be due to the elasticity of the kinematic connections (typically ball-joint connections) between said mechanical members, and in particular to the elasticity of the connection between the rack 12 and the tie rod 3.

Moreover, for convenience of description, the positions of the different elements, and in particular the yaw orientations of the wheel 7 and of the tread of the tire 8BR, will be expressed in the form of linear positions, brought back to the same reference frame as that of the rack 12

Thus, $X_{CR}$ will denote the position called «position of the Center of the Wheel» 7, which corresponds to the yaw orientation of the rigid rim of said wheel 7.

For convenience of description, and for the reasons described in the foregoing, this position of the center of the wheel $X_{CR}$ will preferably be assimilated to the position of the actuation member 3 (position of the tie rod 3) and to the position of the rack 12, knowing that said position of the center of the wheel $X_{CR}$ can be determined from the position of the tie rod 3 and/or the position of the rack 12, by taking into account the geometry, and where appropriate, the elasticity, of the kinematic connections between these members.

Similarly, $X_{BR}$ will denote the position which corresponds to the yaw orientation of the tread 8BR of the tire 8 in contact with the ground 9.

Figure 3:
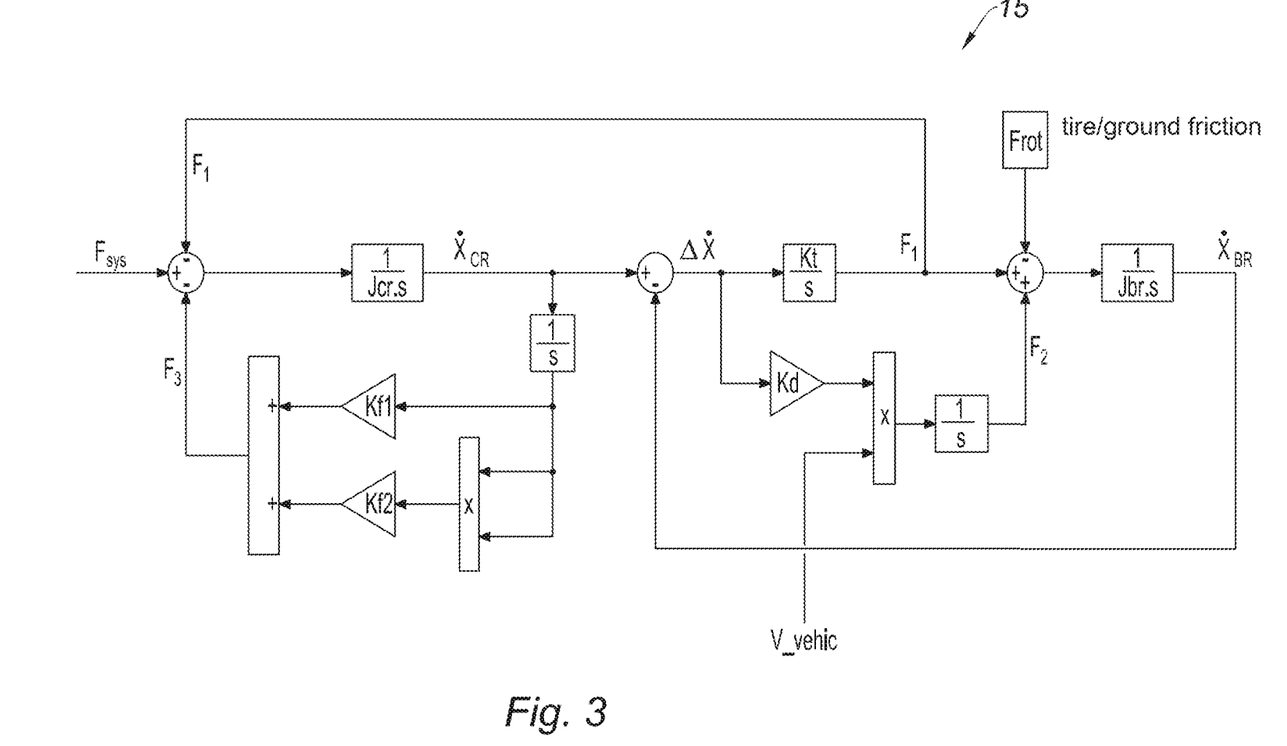
FIG. 3 illustrates, according to a block diagram, the functional transcription of the model of FIG. 2.

In any case, in accordance with the method according to the invention, the estimated value of the force at the tie rods Fb is corrected according to the longitudinal velocity V_vehic of the vehicle 2, as shown in particular in FIG. 3, so as to reduce, in absolute value, the estimated force at the tie rods Fb, according to the longitudinal velocity V_vehic of the vehicle, when the vehicle passes from a parking situation, in which the longitudinal velocity of the vehicle V_vehic is zero (V_vehic=0), to a running situation, in which the longitudinal velocity of the vehicle is non-zero (I V_vehicl>0).

As indicated above, taking into consideration the influence of the velocity of the vehicle V_vehic on the residual elastic torsion between the tread 8BR of the tire and the wheel 7 allows extending the range of validity of the model proposed by the invention both to parking situations and to low-velocity running situations, in particular between 0 km/h and 20 km/h, or up to 30 km/h, and managing the transitions between parking and running situations.

The fact of providing a correction having the effect of reducing the estimated force at the tie rods Fb when moving the vehicle allows advantageously including, in the estimation of the force at the tie rods Fb according to the invention, the progressive release effect of the yaw torsion of the tire 8, and therefore the progressive alignment effect of the tread 8BR on the in yaw position of the wheel 7 which is induced by the rotation of said wheel 7 and the tire 8 (about the horizontal axis of the wheel).

As will be described in more detail below, the invention allows evaluating the force at the tie rods Fb from a model 15 which provides an elastic yaw torsion of the tire 8, under the combined actions of the actuator (and more particularly under the action of the tie rod 3 driven by the rack 12 moved by the steering wheel 5 and/or the power-assist motor 6) on the one hand and the friction of the ground 9 on the other hand, and which includes a correction component that simulates a release of the elastic yaw force of the tire 8 during the transition from the parking situation to the running situation.

In this respect, according to a preferred feature which may constitute an invention on its own, it is possible to determine the force at the tie rods Fb on the one hand from the longitudinal velocity of the vehicle V_vehic and on the other hand from the position $X_{CR}$ of the rack 12 considered as a representative position of the transmission member 3 (tie rod 3), or, more generally, from any equivalent position information representative of the yaw orientation of the rim of the wheel 7, that is to say, representative of the position $X_{CR}$ of the center of the wheel 7 or which allows determining said position $X_{CR}$ of the center of the wheel 7.

Thus, it should be noted that, according to the invention, and according to a feature which may constitute an invention on its own, the acquisition in real time of only two input parameters (measured parameters), namely the longitudinal velocity of the vehicle V_vehic and the position $X_{CR}$ of the rack 12 (or any other equivalent position of a rigid member of the mechanism 4, representative of or allowing access to the yaw orientation $X_{CR}$ of the center of the wheel), is sufficient to calculate the force at the tie rods Fb.

Figure 2:
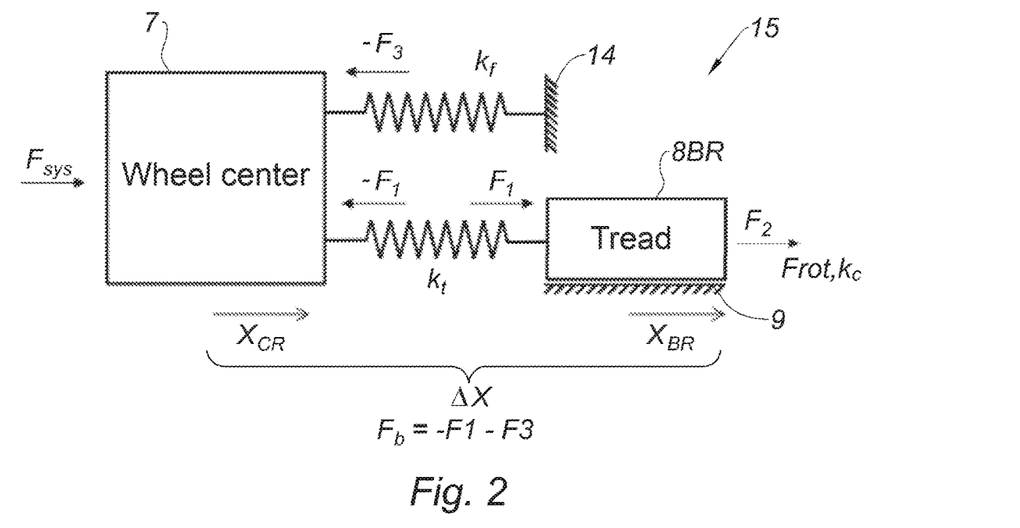
FIG. 2 illustrates a physical model used to determine a force at the tie rods in accordance with the method according to the invention.

According to a preferred feature which may constitute an invention on its own, and as illustrated in FIG. 2, the force at the tie rods Fb is evaluated from a model 15 which uses:

a first force component $F_1$ which is representative of an elastic yaw torsion of the tire 8 corresponding to a position deviation $\Delta X = X_{CR} - X_{BR}$ between on the one hand the position $X_{CR}$ imparted to the transmission member 3 (and more specifically to the wheel 7) by the power steering system 1, that is to say in practice the position $X_{CR}$ of the center of the wheel assimilated to the position of the rack 12, and on the other hand the position $X_{BR}$ of the tread 8BR of the tire which is retained, against the displacements of said transmission member, by a friction resisting force, herein symbolized by the terms «Frot, $k_c$» in FIG. 2, that the ground 9 exerts on said tread of the tire 8BR;

and a second force component $F_2$ which attenuates the first force component $F_1$, according to the longitudinal velocity of the vehicle V_vehic, as soon as the vehicle 2 adopts a non-zero longitudinal velocity, so as to take into consideration the progressive release of the elastic yaw torsion of the tire 8 during a transition between a parking situation, where the longitudinal velocity of the vehicle is zero, and a running situation, where the longitudinal velocity of the vehicle is non-zero.

The position deviation $\Delta X = X_{CR} - X_{BR}$ herein corresponds to the difference in yaw orientation, due to the elastic deformation of the sidewall 8L of the tire 8 under yaw torsional stress, between the yaw orientation $X_{CR}$ of the wheel 7 (rim), as defined by the action of the rack 12 and the tie rod 3, and the yaw orientation $X_{BR}$ of the tread 8BR of the tire 8 retained by the friction Frot, $k_c$ on the ground 9.

This position deviation $\Delta X$ tends to reduce (that is to say to get close to zero) when the vehicle starts moving, and that the rotation of the wheel 7 and the tire 8 (that is to say the running movement of the tire 8 on the ground 9) tends to align the tread 8BR in yaw on the wheel 7, that is to say, tends to make the position $X_{BR}$ of the tread 8BR converge to the position $X_{CR}$ of the wheel 7, increasingly with the rotation (of the tread on the ground 9) of the wheel 7.

It should also be noted that the model 15 allowing evaluating the force at the tie rods Fb preferably uses, in addition to the first force component $F_1$ and the second force component $F_2$, a third force component $F_3$, which depends on the position $X_{CR}$ of the transmission member 3 (and more specifically of the yaw orientation $X_{CR}$ of the wheel 7), relative to the frame 14, in order to model the effects of the lift-up of the vehicle 2 (in this instance the lift-up of the front of the vehicle when the maneuvered steered wheel 7 belongs to the front axle) during the yaw steering of the wheel 7.

This third force component $F_3$, whose calculation will be detailed below, is distinct and independent of the first and second force component $F_1$, $F_2$, and advantageously allows completing the model 15 by taking into consideration the stresses induced by the rolling and pitching of the vehicle 2 which result from the modification of the steering angle (modification of the yaw orientation) of the wheel 7.

Figure 4:
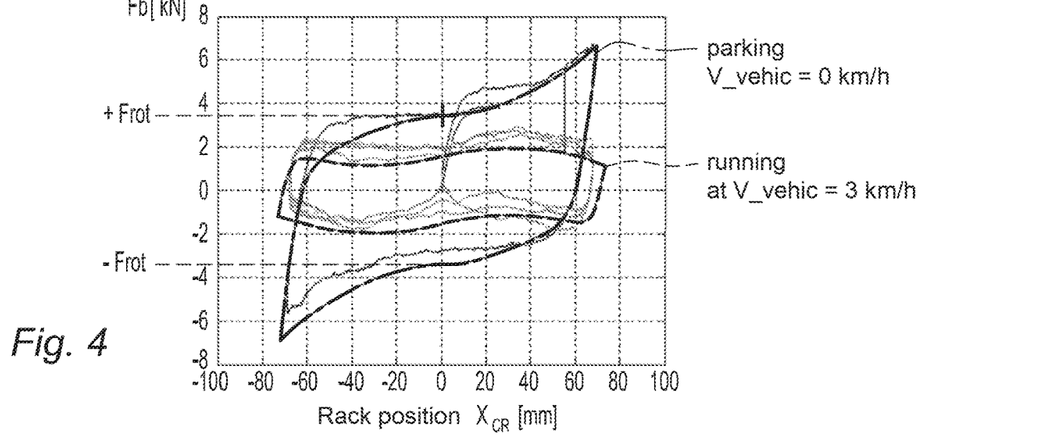
FIGS. 4, 5 and 6 correspond to comparative diagrams which represent, for different vehicle velocities, namely 0 km/h, 3 km/h, 7 km/h and 15 km/h, the hysteresis cycles of the measured effective force at the tie rods estimated by the method according to the invention, as a function of the position of the rack that is varied cyclically in alternate maneuvers from left to right and vice versa.
Figure 5:
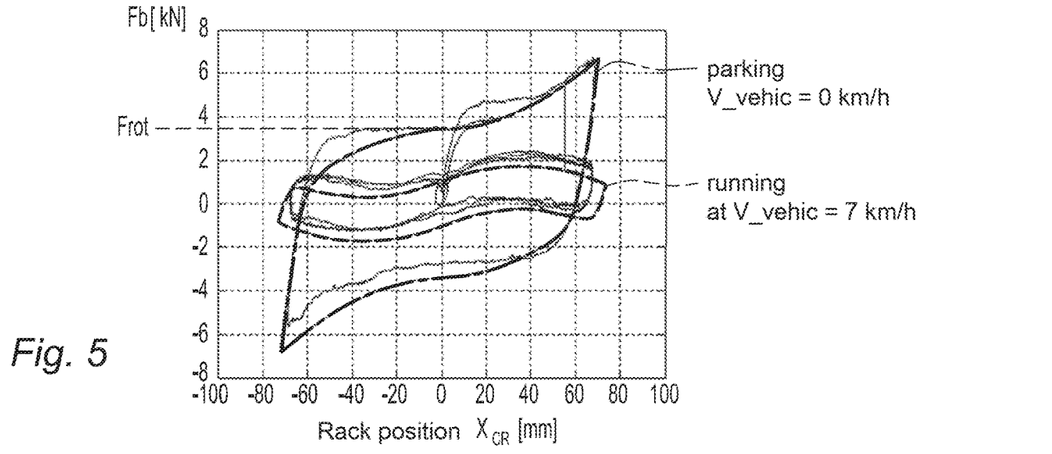
Figure 6:
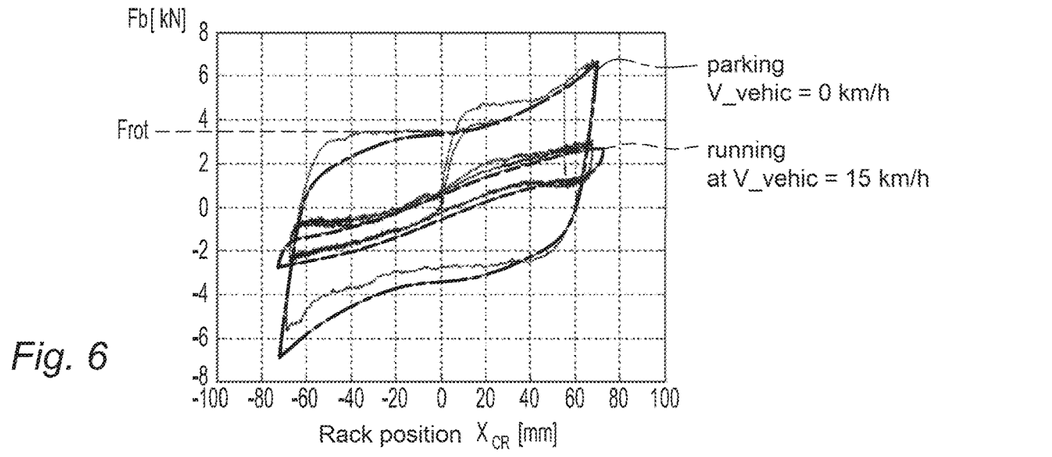

Graphically, as shown in FIGS. 4, 5 and 6, this third force component $F_3$ allows in practice imparting their wavy shape (S-shape) to the hysteresis curves which represent the force at the tie rods Fb as a function of the displacements of the rack 12, that is to say as a function of the yaw position $X_{CR}$ of the wheel 7.

Preferably, the first force component $F_1$ is modeled by means of a first stiffness coefficient $k_t$, representative of the torsional stiffness of the tire 8, which is multiplied by the position deviation $\Delta X$ between the transmission member 3 (and more particularly the rim of the wheel 7) and the tread of the tire 8BR:

$$F_1 = k_t * \Delta X$$

A particularly simple modeling is thus produced which is well representative of the elastic deformation of the sidewalls 8L of the tire which connect the rim, that is to say the rigid portion of the wheel 7, and therefore the rack 12, to the ground 9.

In turn, the second force component $F_2$ is preferably modeled, according to a feature which can constitute an invention on its own, by means of a second coefficient $k_d$ which is multiplied on the one hand by the longitudinal velocity of the vehicle V_vehic and on the other hand by the position deviation $\Delta x$ between the transmission member 3 (and more specifically the rim of the wheel 7) and the tread of the tire 8BR:

$$F_2 = k_d * V\_vehic * \Delta x$$

Herein again, it is therefore possible to use a relatively simple modeling to reflect the effect of moving the vehicle, and thus of the passage from a zero velocity V_vehic to a non-zero velocity, on the force at the tie rods.

It should be noted that, in practice, the second coefficient $k_d$ is expressed in $N*s/m^2$, and therefore in Pa·s, and is therefore homogeneous with a dynamic viscosity.

Preferably, the second force component $F_2$ is calculated from the longitudinal velocity of the vehicle V_vehic and from a static friction value, denoted «Frot», which is representative of the friction force between the tread 8BR and the ground 9, in slip limit, which must be overcome by the action of the transmission member 3 to cause, when the vehicle 2 is stopped, a yaw displacement of the tread 8BR of the tire on the ground 9.

Said static friction value Frot can be empirically determined, through tests, by maneuvering the power steering system 1 when the vehicle is stationary (ie at a zero velocity V_vehic) on the ground 9, preferably on dry ground.

Graphically, the static friction value Frot corresponds to the ordinate at the origin of the hysteresis cycles performed when the vehicle 2 is stationary, that is to say to the threshold force that must be exerted on the wheel 7, from the neutral central position of the steering mechanism 4 (wheels 7 in a straight line, and therefore $X_{CR}=0$) to cause the beginning of the yaw sliding of the tread 8BR on the ground 9 in the desired maneuvering direction.

More specifically, said static friction value Frot corresponds to the friction value which, when the vehicle is stationary (V_Vehic=0), is due to the yaw slip friction of the tread 8BR of the tire 8 on the ground 9, and which therefore opposes a resistance to the established movement of the steering mechanism 4, and more particularly to the established movement of the rack 12, during a maneuver from left to right (or vice versa), and at the time when the steering mechanism 4, and more particularly the rack 12, passes through the central position ($X_{CR}=0$) at an established velocity (of the rack), non-zero ($\dot{X}_{CR} \neq 0$).

For indication, the static friction value Frot used on the vehicle 2 at the origin of the curves of FIGS. 4 to 6 is 3,400 N.

Moreover, according to a feature which may constitute an entirely separate invention, the static friction value Frot may be adjusted according to parameters specific to the vehicle and/or the environment of said vehicle, for example based on criteria related to the meteorological conditions (rain, frost), and which are likely to modify the adherence of the tire 8 on the ground 9.

For example, it is possible to provide to this end a model or a table of values allowing adjusting, where necessary dynamically over time, the static friction value Frot according to parameters specific to the situation of the vehicle and which affect the adherence conditions (number of passengers of the vehicle and/or more generally the load of the vehicle, the inflation level of the tires, dynamic parameters of the vehicle such as the lateral acceleration or the yaw velocity with respect to the steering situation and the velocity of the vehicle, etc.) and/or according to external parameters, specific to the environment of the vehicle, such as the meteorological conditions (temperature, hygrometry, presence of rain, etc.) which also affect the adherence conditions.

In practice, the instantaneous friction value that is effectively exerted on the tread of the tire 8BR may vary, and take any value comprised between +Frot and −Frot.

Where necessary, it is possible to complete the model 15 for evaluating the force at the tie rods Fb, in order to improve its accuracy, by adding an auxiliary friction model such as the LuGre model, in particular to account for the evolution of the instantaneous friction which is exerted on the tread 8BR during transition phases.

These transition phases correspond to the phenomenon observed when the tread 8BR begins to slip on the ground 9, and thus pass from an absence of steering movement to an effective steering movement, of the steady state type, which effectively causes a yaw displacement of the tread 8BR in the wake of the wheel 7.

In practice, said transition phases may correspond to the beginning of a steering maneuver, that is to say when the driver begins to turn the steering wheel 5 to leave the central original position, at the beginning of each hysteresis cycle in FIGS. 4 to 6, or reversals of the steering direction of the steering wheel 5, when the driver reverses the direction of rotation of the steering wheel 5, for example to return the steering wheel 5 to the left after having turned it to the right (or vice versa), as is the case at the ends of the stroke of the rack 12 on the hysteresis cycles represented in FIGS. 4, 5 and 6.

In practice, it is such an auxiliary friction model that confers a rounded shape to the plot of the steering cycle, during said transition phases, that is to say when the tread 8BR begins to slip on the ground 9, and therefore in particular at the beginning of the hysteresis cycle as well as at the steering reversals at the ends of the stroke of the rack 12.

The possibility of resorting to an auxiliary friction model is indicated on the model 15 of FIG. 2 by the mention of a coefficient called «bonding stiffness» $k_c$, which can be used in particular in a LuGre-type model.

The different elements mentioned above and presented on the model 15 of FIG. 2 are found, mathematically, in the block diagram of FIG. 3.

Said block diagram represents the model 15 transcribed as Laplace transfer functions, where «s» is the Laplace variable.

The block diagram accounts in particular for the fundamental principle of dynamics applied to the wheel 7, and more particularly to the rim (wheel center).

It should be noted in this respect that, if the fundamental principle of dynamics is written in the general form:

$$\Sigma F = m \cdot \ddot{x}$$

herein we take into account that a computer does not really know how to «derive» an expression, but knows however very well how to «integrate», which leads to favoring the following form:

$$\dot{x} = \frac{1}{m} \cdot \int \Sigma F \, dt$$

which, once translated into Laplace transfer function gives:

$$\dot{x} = \frac{1}{m} \cdot \frac{\Sigma F}{s}$$

By convention and for convenience, we will consider the integration constants as zero, that is to say, a model 15 for which all state variables are zero at the origin.

However, it would be entirely possible, without departing from the scope of the invention, to consider using non-zero integration constants, in order to start the simulation at any operation point.

To the extent that the fundamental principle of dynamics is herein applied to a yaw rotation of the wheel 7 and the tread 8BR, instead of the mass «m», magnitudes representative of the moments of inertia Jcr, Jbr of the wheel 7 (wheel center) and of the tread 8BR of the tire 8 are herein used.

Similarly, the block-diagram accounts for the force components expressed as stiffness, of the type $$F = k \cdot \Delta x$$

which are translated, again for the same reason of ease of integration, by:

$$F = k \cdot \int \Delta \dot{x} \, dt$$

and therefore by:

$$F = \frac{k}{s} \Delta \dot{x}$$

Moreover, the model of FIG. 2, and its transcription in the block diagram of FIG. 3, show a force value Fsys, which symbolizes, for the sake of completeness, the force transmitted to the wheel 7 by the steering mechanism 4, which typically corresponds to the action of the power-assist motor 6, possibly combined with the manual action of the driver.

However, the force Fsys does not intervene itself in the resolution of the problem, that is to say in the determination of the force at the tie rods Fb by the model 15.

In any case, the output of the model 15, that is to say the force at the tie rods Fb that we seek to estimate, is:

$$Fb = -F_1 - F_3$$

It should also be noted that, in the expression hereinabove, the signs «minus» are used by simple convention in order to indicate that the force at the tie rods Fb is a reaction force of the tie rod 3 and the rack 12 at the conditions of stresses created by the yaw displacement of the wheel 7 (that is to say, created by the steering maneuver).

It should also be noted that, in the block diagram proposed in FIG. 3, the block «Frot» outputs an estimate of the instantaneous friction value between the tread 8BR of the tire 8 and the ground 9, instantaneous friction value which opposes, at the considered moment, the yaw rotation of the wheel 7 and of said tread 8BR relative to the ground 9.

Strictly speaking, and as has been said above, said estimated instantaneous friction value which is returned by said block «Frot» may take on any value comprised between −Frot (value of the static friction, or «slip friction», in a first steering direction) and +Frot (value of the static friction, or «slip friction», in a second steering direction opposite to the first one), according to the yaw displacement velocity $\dot{X}_{CR}$ of the wheel 7 (and more generally according to the displacement velocity $\dot{X}_{CR}$ of the steering mechanism 4), for example on the basis of a LuGre type friction model.

However, as a first approximation, it may be considered that, in practice, the instantaneous friction value corresponds to the value+/−Frot of the static friction, considered in steady state, that is to say considered when the steering mechanism 4, and more particularly the wheel 7, is animated with a substantially constant movement, at a non-zero velocity ($\dot{X}_{CR} \neq 0$), at the time when the central position is crossed ($X_{CR}=0$).

Such a situation indeed actually represents, in practice, an evaluation of the friction during a hysteresis cycle (FIGS. 4 to 6) which corresponds to a succession of steady states (a first steady state allowing carrying out a steering maneuver from left to right, then another state, quickly steady, allowing carrying out the reverse maneuver, from right to left, etc.)

In any case, by simplifying the mathematical expressions resulting from the block-diagram of FIG. 3, we obtain:

$$F_b = -\frac{Frot}{1 + \frac{K_d \cdot V\_vehic}{k_t}} - F_3$$

if the displacement velocity (in yaw) of the wheel 7, and therefore the translation velocity of the rack 12 and more generally the displacement velocity of the steering mechanism 4, is positive, that is to say if $\dot{X}_{CR} > 0$ or, similarly:

$$F_b = \frac{Frot}{1 + \frac{K_d \cdot V\_vehic}{k_t}} - F_3$$

if the displacement velocity (in yaw) of the wheel 7 (and more generally the displacement velocity of the steering mechanism 4) is negative, that is to say if $\dot{X}_{CR} < 0$.

Thus, preferably, and regardless of the sign of the yaw displacement velocity of the wheel 7, the force at the tie rods Fb is calculated from (at least) a first-order term relative to the velocity of the vehicle V_vehic, said term being (in absolute value):

$$\frac{Frot}{1 + \frac{K_d \cdot V\_vehic}{k_t}}$$

It is advantageously this term which introduces the variability, and more particularly the decrease, of the force at the tie rods Fb according to the velocity of the vehicle V_vehic, in order to account for the elastic release of the tire 8, while retaining, via the quotient of the second coefficient $k_d$, attached to the second force component $F_2$, and via the first coefficient $k_t$, attached to the first force component $F_1$, the influence of the two force components $F_1$, $F_2$ which model the torsional situation of the tire 8.

It should be noted that when the rack 12 is in its central position, that is to say when $X_{CR}=0$, the third force component $F_3$ is zero (because, in the absence of steering, the vehicle does not rise), such that we have:

$$F_b(X_{CR}=0) = \frac{Frot}{1 + \frac{K_d \cdot V\_vehic}{k_t}}$$

Hence, the first-order term hereinabove allows defining, for any vehicle velocity V_vehic, the ordinate at the origin of the hysteresis curve (as represented in FIGS. 4 to 6).

It should be noted that this ordinate at the origin decreases, in absolute value, with the velocity of the vehicle, which explains the «settling» observed between the hysteresis curves as the longitudinal velocity of the vehicle V_vehic increases.

At zero velocity of the vehicle, that is to say when the vehicle is stationary, we find again $$Fb(V\_vehic=0) = Frot.$$

It should also be noted that, as indicated above, the first-order term hereinabove corresponds in practice to a steady maneuvering state, that is to say to a situation in which the rack 12, and therefore the wheel 7, is animated with an established non-zero velocity: $\dot{X}_{CR} \neq 0$, when the considered position is crossed, herein the central position $X_{CR}=0$ (coming from the left to the right or vice versa).

Moreover, the second coefficient $k_d$ is preferably adjusted according to the static friction value Frot.

To this end, the model 15 may comprise a mapping that expresses said second coefficient $k_d$ according to the static friction Frot.

Moreover, according to one possible implementation of the invention, it is possible to maintain a second coefficient $k_d$ that is identical regardless of the velocity of the vehicle V_vehic.

According to the experimental findings of the inventors, this approximation remains indeed generally valid.

This is particularly the case on the curves of FIGS. 4 to 6.

Preferably, according to another implementation possibility, and alternatively or complementary to the aforementioned adjustment according to the static friction value Frot, the second coefficient $k_d$ can be adjusted according to the longitudinal velocity of the vehicle V_vehic.

Advantageously, this possibility of varying, where necessary, the second coefficient $k_d$ according to the velocity of the vehicle V_vehic allows in particular reliably extending the range of validity of the model 15 for calculating the force at the tie rods Fb over a range of low and medium velocities, typically up to V_vehic=30 km/h at least, and thus perfect the correlation between said model 15 and the real behavior of the vehicle.

This possibility of adjusting the second coefficient $k_d$ will thus allow, where necessary, guaranteeing a reliable overlap between said «low velocities» model 15 and another model for calculating the force at the tie rods Fb validated for the high vehicle velocities V_vehic (over 30 km/h or even 50 km/h).

For example, the inventors have indeed found that it is possible, as a first approximation, to successfully use a second coefficient $k_d$ constant between 0 km/h and 15 km/h, but that it might be desirable to modify it beyond, for higher vehicle velocities V_vehic, and in particular between 15 km/h and 30 km/h.

Herein again, it will be possible to provide a suitable mapping, or any appropriate evolution law.

In turn, the third force component F3 is preferably calculated, as shown in FIG. 3, from a second-degree polynomial comprising a linear term and a quadratic term relative to the position $X_{CR}$ of the transmission member 3 (position of the rim of the wheel 7):

$$F_3 = kf1 * X_{CR} + kf2 * X_{CR}^2.$$

Strictly speaking, by considering the sign convention used in the foregoing, we will have:

$F_3 = (k_{f1} \cdot X_{CR} + k_{f2} \cdot X_{CR}^2) \cdot \mathrm{sgn}(X_{CR})$ where «sgn $(X_{CR})$» is the sign of the position value $X_{CR}$ of the wheel 7, respectively of the rack 12, relative to the central position.

Advantageously, such a second-degree polynomial faithfully accounts for the forces induced in the steering mechanism 4 by the lift-up of the vehicle when the wheels 7 are turned in yaw.

As indicated above, the value of this polynomial expression is zero when the rack 12 is in the central position, that is to say that the wheels 7 are oriented in a straight line such that $X_{CR}=0$, and that, consequently, no lift-up of the vehicle 2 takes place.

Preferably, the coefficients kf1, kf2 of the second-degree polynomial are adjusted according to the longitudinal velocity of the vehicle V_vehic.

Herein again, such an adjustment allows refining the accuracy and the reliability of the model 15.

For illustration, FIGS. 4, 5 and 6 show some hysteresis curves which represent, for different velocity values of the vehicle V_vehic, the value of the force at the tie rods Fb on the ordinate, as a function of the displacement of the rack 12 on the abscissa (that is to say according to the corresponding position $X_{CR}$ of the rim of the wheel 7).

The rack was herein animated with a cycle of comings and goings, leading at first the wheel 7 to the right, then to the left, and so on.

On each graph, the smooth curve in dashed line corresponds to the modeled cycle, that is to say to the value of the force at the tie rods Fb estimated according to the model 15, in parking situation, vehicle stopped (V_vehic=0).

The smooth curve in dotted line corresponds to the modeled cycle, that is to say to the value of the force at the tie rods Fb estimated according to the model 15, in running situation, at the indicated velocity (in this case respectively 3 km/h, 7 km/h and 15 km/h).

The noisy curves correspond to the force at the tie rods Fb, measured for example by means of extensometric gauges, according to these same cycles of alternating displacement of the rack 12.

We notice that there is a very strong correlation, almost a superposition, between the modeled curves and the measured curves, which indicates a high reliability of the model 15, and this for different values of the vehicle velocity V_vehic.

Thus, the experimental results confirm that the invention allows extending the range of validity of the model for estimating the force at the tie rods from the parking situation to a wide running range at low speed, extending at least up to 20 km/h, up to 30 km/h, or even further.

Strictly speaking, on the graphs presented in FIGS. 4, 5 and 6, there should be noted a slight offset on the ordinate between the modeled force values Fb and the measured force values Fb.

This slight deviation was due to a simple lack of symmetry of the tested wheel gear 7. It can therefore easily be mechanically corrected, by properly adjusting the wheel gear 7 (and the steering mechanism 4) to restore the symmetry relative to the original central position.

Of course, the invention is not limited to the above-mentioned variants, one skilled in the art being in particular able to freely isolate or combine together either one of the features described in the foregoing, or to substitute them with an equivalent.

In particular, the invention concerns as such the use, for the force estimation within a power steering system, of a model 15 including a correction component $F_2$ simulating the release of the yaw torsion force of the tire 8 (progressively with the longitudinal velocity V_vehic of the vehicle) when the vehicle 2 passes from a parking situation to a running situation.

The invention also relates to a power steering system 1 equipped with a model 15 according to the invention, as well as on a computer-readable data medium and allowing implementing a method for estimating a force at the tie rods when said medium is read by a computer.

The invention claimed is:

1. A method of evaluating an actuation force on a transmission member that is called force at tie rods when a vehicle transitions from a parking situation to a running situation, comprising:

transitioning the vehicle from the parking situation to the running situation; and evaluating the force at the tie rods by a process comprising:

initially estimating a value for the force at the tie rods to obtain an estimated value for the force at the tie rods; and correcting the estimated value for the force at the tie rods by reducing said estimated value, in absolute value, according to a longitudinal velocity of the vehicle (V_vehic) when the vehicle transitions from the parking situation, in which the longitudinal velocity of the vehicle (V_vehic) is zero, to the running situation, in which the longitudinal velocity of the vehicle (V_vehic) is non-zero, wherein:

the vehicle is equipped with a power steering system comprising a steering mechanism that connects an actuator to a steered wheel that is orientable in yaw;

the steered wheel carries a tire with a tread that is in contact with a ground; and the steering mechanism comprises the transmission member on which the actuation force is evaluated.

2. The method according to claim 1, wherein the force at the tie rods is evaluated from a model using:

a first force component ($F_1$) that is representative of a yaw elastic torsion of the tire corresponding to a position deviation ($\Delta x$) between on the one hand a position ($X_{CR}$) imparted to the transmission member by the power steering system and on the other hand a position ($X_{BR}$) of the tread of the tire which is retained, against displacements of the transmission member, by a friction resistant force (Frot, $k_c$) that the ground exerts on the tread of the tire, and a second force component ($F_2$) that attenuates the first force component ($F_1$), according to the longitudinal velocity of the vehicle (V_vehic), as soon as the vehicle adopts a non-zero longitudinal speed, so as to take into consideration a progressive release of the yaw elastic torsion of the tire during the transition between the parking situation, where the longitudinal velocity of the vehicle is zero, and the running situation, where the longitudinal velocity of the vehicle is non-zero.

3. The method according to claim 2, wherein the first force component ($F_1$) is modeled by means of a first stiffness coefficient ($k_t$), representative of a torsional stiffness of the tire, which is multiplied by the position deviation ($\Delta x$) between the transmission member and the tread of the tire: $F_1 = k_t * \Delta x$.

4. The method according to claim 2, wherein the second force component ($F_2$) is modeled by means of a second coefficient ($k_d$) multiplied by the longitudinal velocity of the vehicle (V_vehic) and by the position deviation ($\Delta x$) between the transmission member and the tread of the tire: $F_2 = k_d * V\_vehic * \Delta x$.

5. The method according to claim 4, wherein the second force component ($F_2$) is calculated from the longitudinal velocity of the vehicle (V_vehic) and from a static friction value (Frot) that is representative of a friction force between the tread and the ground, in slip limit, which must be overcome by an action of the transmission member to cause, when the vehicle is stopped, a yaw displacement of the tread of the tire on the ground.

6. The method according to claim 5, wherein the force at the tie rods is calculated from a first-order term relative to the longitudinal velocity of the vehicle (V_vehic) and equal to $$\frac{Frot}{1 + \frac{K_d \cdot V\_vehic}{k_t}}.$$

7. The method according to claim 5, wherein the second coefficient ($k_d$) is adjusted according to the static friction value (Frot).

8. The method according to claim 5, wherein the static friction value (Frot) is adjusted according to parameters specific to the vehicle or to an environment of the vehicle and which modify an adhesion of the tire on the ground.

9. The method according to claim 4, wherein the second coefficient ($k_d$) is adjusted according to the longitudinal velocity of the vehicle (V_vehic).

10. The method according to claim 2, wherein the model allowing evaluation of the force at the tie rods additionally uses a third force component ($F_3$), which depends on the position ($X_{CR}$) of the transmission member, in order to model effects of lift-up of the vehicle during yaw steering of the steered wheel.

11. The method according to claim 10, wherein the third force component ($F_3$) is calculated from a second-degree polynomial comprising a linear term and a quadratic term relative to the position ($X_{CR}$) of the transmission member: $F_3 = kf1 * X_{CR} + kf2 * X_{CR}^2$.

12. The method according to claim 11, wherein the coefficients (kf1, kf2) of the second-degree polynomial are adjusted according to the longitudinal velocity of the vehicle (V_vehic).

13. The method according to claim 1, wherein the force at the tie rods is representative of a force exerted by the transmission member formed by a steering tie rod on one end of a rack that is movably mounted relative to a frame of the vehicle, and the steering tie rod connects to the steered wheel, and the force at the tie rods is evaluated from the longitudinal velocity of the vehicle (V_vehic) and the position of the rack ($X_{CR}$) considered as a representative position of the transmission member.

* * * * *